Nov. 29, 1966          W. W. SHEPHERD          3,288,232
                       WHEEL SPEED CONTROL
Filed Sept. 21, 1964                          3 Sheets-Sheet 1
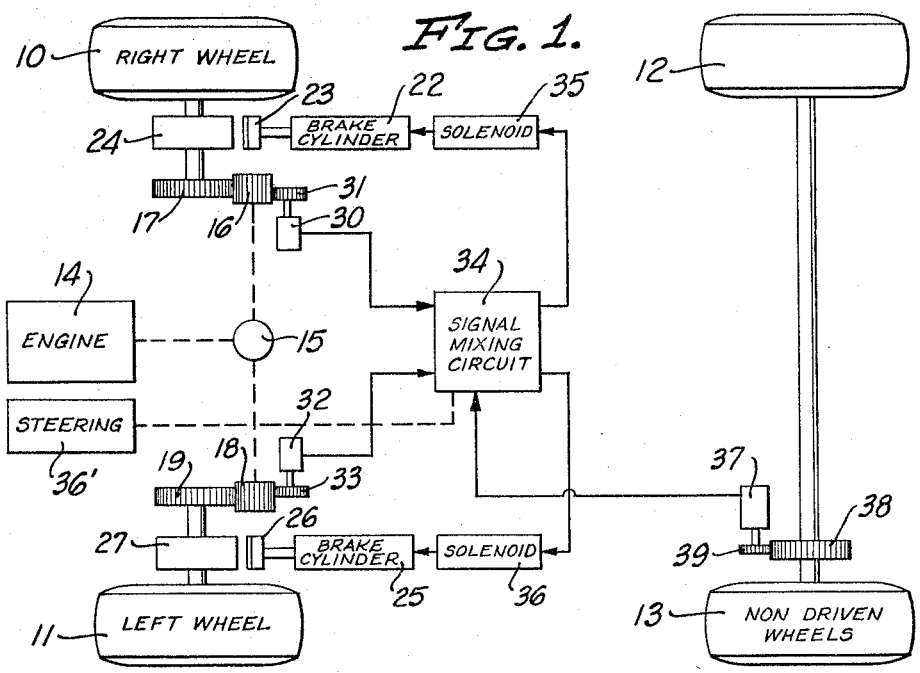
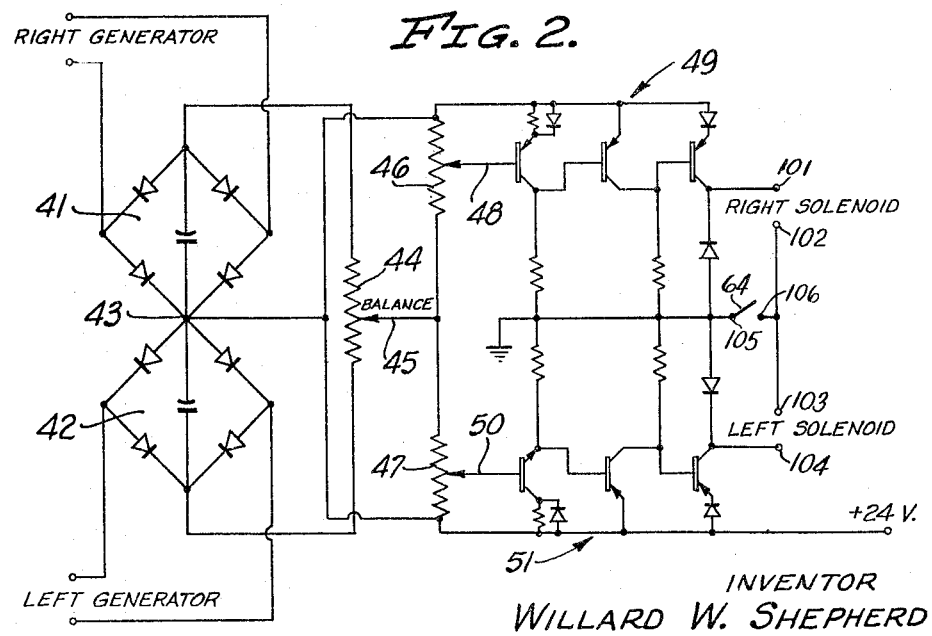
INVENTOR
WILLARD W. SHEPHERD
BY HIS ATTORNEYS
HARRIS, KIECH, RUSSELL & KERN

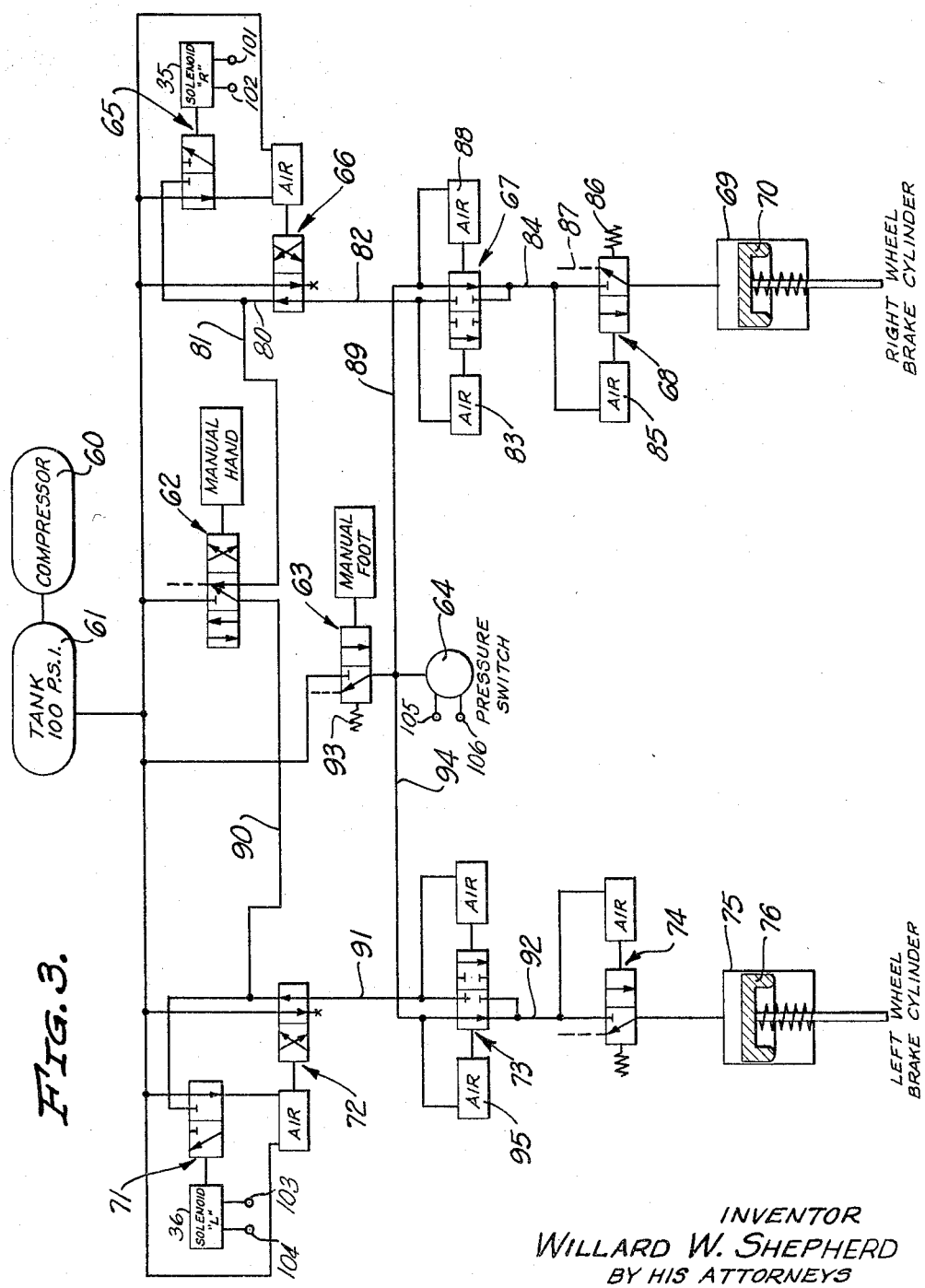

Nov. 29, 1966 W. W. SHEPHERD 3,288,232

WHEEL SPEED CONTROL

Filed Sept. 21, 1964 3 Sheets-Sheet 3

INVENTOR
WILLARD W. SHEPHERD
BY HIS ATTORNEYS
HARRIS, KIECH, RUSSELL & KERN

United States Patent Office 3,288,232
Patented Nov. 29, 1966

3,288,232
WHEEL SPEED CONTROL
Willard W. Shepherd, Whittier, Calif., assignor to Shepherd Machinery Co., Industry, Calif., a limited partnership
Filed Sept. 21, 1964, Ser. No. 397,857
3 Claims. (Cl. 180—1)

This application is a continuation-in-part of my copending application Serial No. 136,085 filed September 5, 1961, entitled Wheel Speed Control, now U.S. Patent 3,169,595.

This invention relates to a wheel speed control and, in particular, to a control for limiting slipping or overspeeding of a driven wheel of a vehicle.

Slipping or overspeeding of a driven wheel is often encountered in vehicles in which the driven wheels are not directly coupled together. A typical example is the conventional passenger automobile in which the two rear wheels are driven from the motor through a differential gear unit. In such an arrangement, power is transferred to the wheel with the least traction and undesired results obtain when one driven wheel is running on a relatively frictionless surface or is suspended above the running surface. The same type of overspeeding can result in vehicles in which the wheels are driven from separate engines or other power plants.

While being stuck in the mud is annoying to the driver of a passenger vehicle, this type of overspeeding presents a much more serious problem with large vehicles such as modern rubber-tired earth movers and loaders. The large forces generated during wheel spinning in the short time before the operator can manually change the mode of operation of the vehicle subject the machinery to severe stresses often resulting in damage to the equipment.

Accordingly, it is an object of the present invention to provide a wheel speed control for limiting the overspeeding of a driven wheel of a vehicle. A further object is to provide such an apparatus including means for sensing the speed of each driven wheel, means for determining when the wheel speeds are different, and means for reducing the speed of the overspeeding wheel. A further object is to provide such an apparatus incorporating means for modifying the operation of the apparatus during the execution of normal turns. Another object is to provide such an apparatus incorporating means for controlling the overspeeding of both driven wheels of a vehicle.

It is a particular object of the invention to provide a wheel speed control for a vehicle having first and second driven wheels including first signal generating means for generating a first signal which varies as a function of the rotational speed of the first wheel, second signal generating means for generating a second signal which varies as a function of the rotational speed of the second wheel, first speed reducing means for reducing the speed of the first wheel, second speed reducing means for reducing the speed of the second wheel, signal mixing means for determining the difference between the first and second input signals and producing an output signal which varies as a function of such difference, and means for coupling the output signal to the speed reducing means in controlling relationship for reducing the speed of a driven wheel when its speed exceeds that of the other driven wheel by a predetermined amount. A further object is to provide such an apparatus including manual control means for selectively actuating each of the speed reducing means independently of the output signal permitting the operator of the vehicle to control the speed of individual driven wheels in cooperation with the wheel speed control. A further object is to provide manual control means for actuating both of the speed reducing means for reducing the speed of the vehicle with such control means including a means for preventing selective actuation of the speed reducing means so that the vehicle braking operation takes precedence over the wheel overspeed control operation.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a diagrammatic showing of a preferred embodiment of the invention;

FIG. 2 is an electrical schematic of the signal mixing circuit of FIG. 1;

FIG. 3 is a diagram of the pneumatic system of a preferred embodiment of the wheel speed control;

Figure 4:
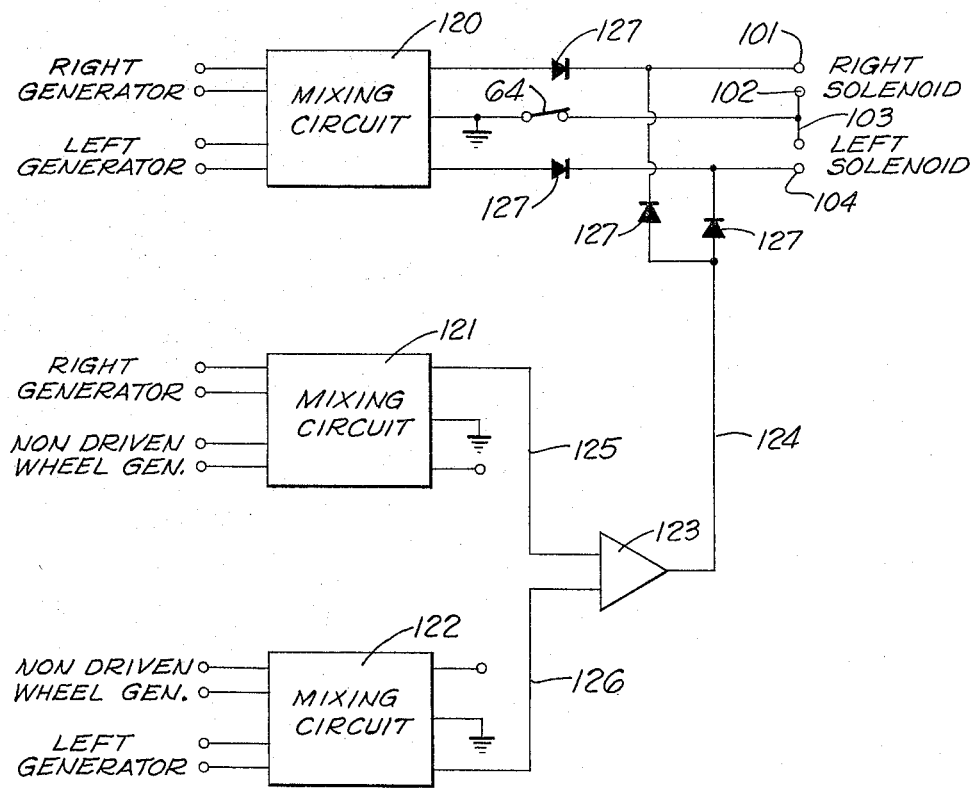
FIG. 4 is an electrical diagram of an alternative circuit.

FIG. 1 illustrates the running gear of a typical vehicle having driven wheels 10, 11 and nondriven wheels 12, 13. The wheel 10 is driven from an engine 14 through a differential 15 and gears 16, 17 while the wheel 11 is driven from the engine through the differential and gears 18, 19.

Independent speed reducing means are provided for each of the driven wheels. Typically a brake cylinder 22 may drive a brake shoe 23 for engagement with a drum 24 on the axle of the wheel 10. A similar cylinder 25, shoe 26, and drum 27 may be provided for the wheel 11.

An electrical generator 30 is driven from the gear 16 via a gear 31 and produces a signal which varies as a function of the rotational speed of the wheel 10. A similar generator 32 is driven from the gear 18 through another gear 33 to provide a signal which varies as a function of the rotational speed of the wheel 11. The signals from the two generators are combined in a signal mixing circuit 34 which provides an output signal for controlling solenoids 35, 36. When the speed of one of the driven wheels exceeds that of the other driven wheel by a predetermined amount, the signal mixing circuit provides an output to one of the solenoids for energizing the associated brake cylinder and reducing the speed of the overspeeding wheel to that of the other driven wheel. A specific form of signal mixing circuit is illustrated in FIG. 2 and will be described below.

The maximum amount of overspeeding or speed difference between the two driven wheels may be controlled by adjusting the sensitivity or operating limits of the signal mixing circuit. The normal difference in speed of the two wheels during execution of a turn may be taken care of by adjusting the apparatus to a sensitivity level such that the speed differential during turning does not produce an output signal. In an alternative arrangement, the mixing circuit may be adjusted to have a relatively high sensitivity so that very small speed differentials are detected and controlled, with the operation of the mixing circuit being varied during turns to maintain the same sensitivity. This may be accomplished by adjusting an operating parameter of the mixing circuit, as by mechanically varying the setting of a component of the circuit directly from the steering mechanism 36'.

The wheel speed control may also be used to reduce the speeds of both driven wheels when both are slipping even though running at the same speed. An electrical generator 37 may be driven from one of the nondriven wheels through gears 38, 39 to provide a signal to the mixing circuit which varies as a function of the rotational speed of the nondriven wheel. The signal mixing circuit may provide for comparison of the signals from the generators 30 and 32 with the signal from the generator 37 so that when both wheels 10 and 11 are running faster than wheel 13, both solenoids will be energized.

A specific arrangement for the signal mixing circuit 34 is shown in FIG. 2. The signal from the generator 30 is connected across a rectifier bridge 41 and the signal from the generator 32 is connected across a similar rectifier bridge 42. One terminal of each of the bridge outputs are connected together at point 43 to a reference potential, here +24 volts. The other terminal of the bridge 41 is connected to one end of a potentiometer 44. Similarly, the other terminal of the bridge 42 is connected to the other end of the potentiometer 44. The arm 45 of the potentiometer is connected to one end of potentiometers 46, 47, the other ends of each of these potentiometers being connected to the point 43. The arm 48 of the potentiometer 46 provides an input signal for a three-stage amplifier 49 and the output of this amplifier drives the solenoid 35 via terminals 101, 102. Similarly, the arm 50 of the potentiometer 47 provides an input for the three-stage amplifier 51 and the output of this amplifier drives the solenoid 36 via terminals 103, 104. A normally closed switch 64 is connected in the line to the solenoid terminals 102, 103, via terminals 105, 106.

The potentiometers 46, 47 permit adjustment of the sensitivity of the signal mixing circuit. The potentiometer 44 may be used as a balance control for balancing the operation of the circuit. The arm 45 of the balance potentiometer will be adjusted to provide a zero voltage between the arm and the point 43 when the vehicle is traveling in a straight path. Then there is zero voltage across each of the potentiometers 46, 47 and both solenoids are in the normal unenergized condition.

When the speed of the vehicle increases, the signals from both right and left generators will increase at the same rate and the output signal at the arm 45 and point 43 will remain zero. However, if one wheel begins to slip or overspeed and runs faster than the other wheel, the signal from the corresponding generator will increase, resulting in a voltage between the arm and the point 43. When this voltage exceeds a predetermined value, the corresponding solenoid will be energized to actuate the brake cylinder and slow the wheel.

The steering mechanism 36' may be mechanically coupled to the arm 45 of the balance potentiometer 44 as by means of mating gears carried on the steering wheel shaft and on the potentiometer shaft. The mechanical motion of the arm may be adjusted to match the output signal due to unbalancing the circuit with the output signal due to the speed differential resulting from a normal turn so that the resultant output signal remains zero as long as the difference in speed between the right and left wheels is as it should be for the particular rate of turn being performed. Deviation from this speed differential will result in an output signal and actuation of one of the brake solenoids, as in the straight-ahead operation.

Figure 5:
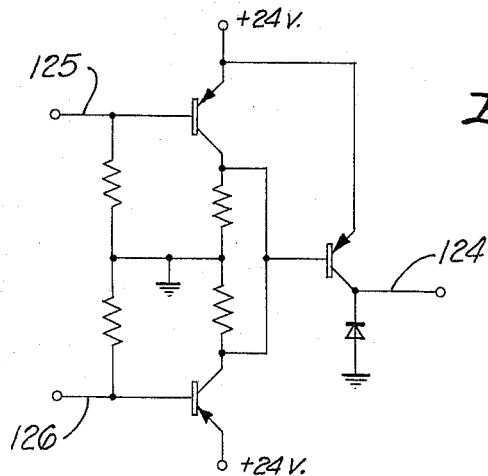
FIG. 5 is an electrical schematic of a typical coincident gated amplifier.

In an alternative arrangement incorporating the nondriven wheel generator 37 (FIG. 4), the signals from the driven wheel generators 30 and 32 may be connected to a mixing circuit 120 of the form of FIG. 2, signals from the generators 30 and 37 may be connected as inputs to a second circuit 121 of the form of FIG. 2, and signals from the generators 32 and 37 may be connected as inputs to a third circuit 122 of the form of FIG. 2. The second circuit 121 will produce an output when the driven wheel 10 is overspeeding and similarly, the third circuit 122 will produce an output when the driven wheel 11 is overspeeding. These two outputs can be connected in series to energize both solenoids 35 and 36 only when both of the driven wheels are running faster than the nondriven wheel, as by means of a coincident gated amplifier 123 which produces an output on line 124 when there are inputs on each of lines 125, 126. Diodes 127 may be utilized in the connections to the solenoids for blocking crosscoupling or sneak paths between the output of the mixing circuit 120, the amplifier 123, and the right and left solenoids. A typical circuit for the amplifier 123 is shown in FIG. 5.

FIG. 3 illustrates a preferred pneumatic system for operation with the vehicle of FIG. 1 and the mixing circuit of FIG. 2. The system includes a compressor 60, a storage tank 61, a first manual valve 62 which is ordinarily hand operated, a second manual valve 63 which is ordinarily foot operated, and a pressure switch 64. The right wheel section includes a solenoid valve 65, air valves 66, 67, a quick release air valve 68, and a brake cylinder 69 with spring loaded piston 70. A similar solenoid valve 71, air valves 72, 73, 74, and brake cylinder 75 and piston 76 are provided for the left wheel system.

All of the valves are shown in FIG. 3 in the neutral position with the brakes released. In the neutral position, air at line pressure is directed to both sides of the valve 66. When the solenoid valve 65 is energized, the valve is moved to the left as seen in FIG. 3, connecting the left chamber of the air valve 66 to exhaust through line 80, line 81 and the manual valve 62. This produces motion to the left of the valve 66 and couples line pressure through the valve 66 and line 82 to the valve 67. Air under pressure in the chamber 83 of the valve 67 produces movement of this valve to the right and couples air under pressure through line 84 to the valve 68. Air under pressure in the chamber 85 of the valve 68 causes this valve to move to the right against the action of the spring 86, directing air under pressure into the brake cylinder 69 for actuation of the brake system.

De-energization of the solenoid valve 65 produces movement of this valve to the right which results in balanced air pressures to the valve 66 and movement of the latter valve to the right. Then the line 84 is connected to exhaust through the lines 82 and 81. When the chamber 85 is exhausted, the valve 68 is moved to the left by the action of the spring 86 and the brake cylinder 69 is connected to the exhaust line 87. The valve 67 will remain in the right-hand position until pressure is introduced into the chamber 88 through the line 89.

The operation of the left wheel system is identical to that of the right wheel system and will not described in detail. The manual valve 62 may be used to selectively actuate either the right or left wheel brake cylinder as desired. When the manual valve 62 is moved to the left, air at line pressure is coupled to the right wheel cylinder through lines 81, 82 and 84. Similarly, when the manual valve 62 is moved to the right, air at line pressure is introduced into the left wheel cylinder 75 through lines 90, 91, valve 73, line 92, and valve 74. Return of the manual valve 62 to the center position connects both lines 81 and 90 to exhaust.

The manual valve 63 provides for normal braking operation of the vehicle by actuating both wheel cylinders simultaneously. The manual valve 63 is moved to the left against the action of the spring 93 to introduce air at line pressure to the lines 89 and 94. The chamber 88 of the valve 67 is energized to move the valve 67 to the left introducing air at line pressure to the line 84 for energization of the right wheel cylinder 69. Similarly, air at line pressure in the chamber 95 of the valve 73 moves this valve to the right introducing air at line pressure into the line 92 for actuation of the left wheel cylinder 75. Release of the manual valve 63 permits the spring 93 to move the valve to the right connecting lines 89 and 94 to exhaust for releasing the brakes on both wheels.

The pressure switch 64 is energized by the pressure in lines 89, 94 and disables both solenoids during the manual braking operation. The pressure switch may be a conventional unit such as is used in the passenger automobile brake line to turn on the brake light, and includes a set of electrical contacts which are connected in series with the common connection to the solenoids so that neither can be energized when the switch is actuated.

Most of the components utilized in the apparatus described herein are standard items and, for example, may be found fully illustrated in Caterpillar Tractor Co. Parts Catalog for DW21 Tractor, Form 33109, published April 1958. The wheel brake cylinder may be Part No. 8F2041, pages 106, 109; the quick release valve Part No. 4F6941, pages 106, 111; the shuttle valve Part No. 5F6056, page 107; the manual foot control Part No. 5F6055, page 108, the manual hand control Part No. 3F2782, pages 107, 111; the steering mechanism, pages 112–117; and the solenoid air valve may be ASCO No. 8344.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a wheel speed control for a vehicle having first and second driven wheels and a nondriven wheel, the combination of:
    first signal generating means for generating a first signal which varies as a function of the rotational speed of the first wheel;
    second signal generating means for generating a second signal which varies as a function of the rotational speed of the second wheel;
    third signal generating means for generating a third signal which varies as a function of the rotational speed of the nondriven wheel;
    first speed reducing means for reducing the speed of the first wheel;
    second speed reducing means for reducing the speed of the second wheel;
    control circuit means for producing a selected one of two output signals when first and second input signals differ by a predetermined amount and producing both of said output signals when both the first and second input signals differ from a third input signal by a predetermined amount;
    means for coupling said first, second and third signals to said control circuit means as inputs; and
    means for coupling said output signals to said first and second speed reducing means, respectively, in controlling relation.

2. In a wheel speed control for a steerable vehicle having first and second driven wheels and a nondriven wheel and having a manually actuated steering means, the combination of:
    first signal generating means for generating a first signal which varies as a function of the rotational speed of the first wheel;
    second signal generating means for generating a second signal which varies as a function of the rotational speed of the second wheel;
    third signal generating means for generating a third signal which varies as a function of the rotational speed of the nondriven wheel;
    first speed reducing means for reducing the speed of the first wheel;
    second speed reducing means for reducing the speed of the second wheel;
    control circuit means for producing a selected one of two output signals when first and second input signals differ by a first predetermined amount and producing both of said output signals when both the first and second input signals differ from a third input signal by a second predetermined amount, and including turning rate means for varying said first predetermined amount as a function of the turning rate of the vehicle;
    means for coupling said first, second and third signals to said control circuit means as inputs;
    means for connecting said manually actuated steering means to said turning rate means in driving relation; and
    means for coupling said output signals to said first and second speed reducing means, respectively, in controlling relation.

3. In a wheel speed control for a vehicle having first and second driven wheels and a nondriven wheel, the combination of:
    first signal generating means for generating a first signal which varies as a function of the rotational speed of the first wheel;
    second signal generating means for generating a second signal which varies as a function of the rotational speed of the second wheel;
    third signal generating means for generating a third signal which varies as a function of the rotational speed of the nondriven wheel;
    first speed reducing means for reducing the speed of the first wheel;
    second speed reducing means for reducing the speed of the second wheel;
    a first control circuit having said first and second signals as inputs for producing one of two output signals when one of said input signals exceeds the other by a predetermined amount and producing the other of two output signals when said other input signal exceeds said one input signal by a predetermined amount;
    a second control circuit having said first, second and third signals as inputs for producing both of said output signals when both said first and second input signals differ from said third input signal by a predetermined amount; and
    means for coupling one of said output signals to said first speed reducing means and the other of said output signals to said second speed reducing means in controlling relation.

References Cited by the Examiner
UNITED STATES PATENTS 2,401,628  6/1946  Eksergian _____ 303—21 X
3,025,722  3/1962  Eger et al.

BENJAMIN HERSH, *Primary Examiner.*

J. A. PEKAR, *Assistant Examiner.*